3,388,166
DINITRO-2-METHYL-2-PHENYLINDANONES
Herman A. Bruson, Woodbridge, and Howard L. Plant, Milford, Conn., assignors to Olin Mathieson Chemical Corporation, a corporation of Virginia
No Drawing. Filed Mar. 1, 1967, Ser. No. 619,616
3 Claims. (Cl. 260—590)

ABSTRACT OF THE DISCLOSURE

A series of dinitro-2-methyl-2-phenylindanones are prepared by the nitration of the corresponding 2-methyl-2-phenylindanones. The new compounds are useful as chemical intermediates in the preparation of dyestuffs and polyurethane foams.

---

This invention relates to dinitro-2-methyl-2-phenylindanones having the following general formula:

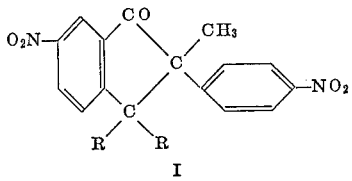

I wherein each R is independently selected from the group consisting of hydrogen and alkyl.

Various 2-methyl-2-phenylindanoes have been previously prepared and described in the literature. For example, 2-methyl-2-phenylindanone-1, a valuable drug intermediate, is disclosed by N. Campbell and E. Ciganek, J. Chem. Soc. (London), 1956, 3834–3836. The preparation of beta-disubstituted alpha-indanones by the reaction of an aliphatic halide with carbon monoxide and an aromatic compound in the presence of aluminum halide is described by H. A. Bruson and H. L. Plant in copending U.S. Patent application Ser. No. 417,507, filed Dec. 10, 1964.

Now it has been found that a series of dinitro-2-methyl-2-phenylindanones having the Formula I can be conveniently provided by nitration of the previously described 2-methyl-2-phenylindanones in accordance with the following equation wherein R is as previously described.

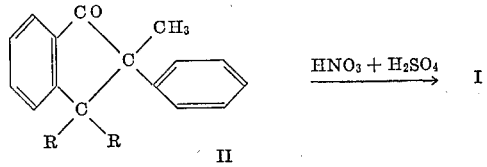

While any of the 2-methyl-2-phenylindanone precursors represented by the Formula II can be employed in the preparation of the compounds of this invention, preferred embodiments utilize those 2-methyl-2-phenylindanones wherein each R is independently selected from the group consisting of hydrogen and lower alkyl, i.e., alkyl having from 1 to 4 carbon atoms. Thus, preferred 2-methyl-2-phenylindanones include 2-methyl-2-phenylindanone - 1; 2,3 - dimethyl-2-phenylindanone-1; 2,3,3-trimethyl-2-phenylindanone-1; 2-methyl-3-propyl-2-phenylindanone - 1; 2,3-dimethyl-3-propyl-2-phenylindanone-1; 2-methyl-3-t-butyl-2-phenylindanones-1 and the like.

More in detail, the compounds of this invention are provided by reacting a 2-methyl-2-phenylindanone II with a mixture of nitric acid and sulfuric acid. At least two moles of nitric acid having a concentration of about 65–100 percent are employed per mole of Compound II, and sufficient sulfuric acid is employed to function as a dehydrating agent for the water formed in the reaction. Generally, at least two moles of 85–100 percent sulfuric acid are employed per mole of Compound II. If desired, an excess amount of either or both acids can be used.

The nitration process can be carried out over a temperature range from about 0°–100° C. After completion of the reaction, the desired dinitro-2-methyl-2-phenylindanone I is isolated from the reaction mixture by conventional techniques, such as crystallization, filtration, and the like.

The dinitro-2-methyl-2-phenylindanones of this invention have a wide variety of useful applications. They are valuable chemical intermediates, suitable for reaction with a variety of compounds. Thus, they are reduced with iron and hydrochloric acid to provide the corresponding diamines, which are diazotized and/or tetrazotized with sodium nitrate to provide useful dye-stuff intermediates. Furthermore, these diamines, when reacted with phosgene, provide stable, reactive aromatic diisocyanates suitable for use in the preparation of polyurethane plastics and foams. For example, 2,3 - dimethyl - 2 - (p - aminophenyl)-6-amino-indanone-1 is phosgenated and reacted with oxypropylated glycerine in the presence of a blowing agent and a reaction catalyst to provide a rigid polyurethane foam having excellent physical properties.

The following examples will serve to illustrate the preparation of dinitro-2-methyl-2-phenylindanones I in accordance with the process of this invention.

Examples I 2-methyl-2-phenylindanone-1 was prepared by reacting 1,2,2-trichloropropane with benzene and carbon monoxide in the presence of anhydrous aluminum chloride in accordance with the process described in copending patent application U.S. Ser. No. 417,705.

A mixture of 60 g. (0.6 mole) of 69.5 percent nitric acid and 100 g. of 96–98 percent sulfuric acid was cooled to 0°–5° C. in an ice bath. To the cooled acid mixture was added gradually with stirring 66.6 g. (0.3 mole) of 2-methyl-2-phenylindanone-1. After completion of the addition (75 minutes), the temperature of the reaction mixture had risen to 25–30° C. Heat was applied, and the reaction mixture maintained at 65° C. with stirring for 30 minutes. The reaction mixture was then cooled to room temperature, poured with stirring onto crushed ice and treated with ether to provide a solid precipitate. After filtration, the solid material was recrystallized from methanol to provide 51.5 g. of colorless crystals, M.P. 140–140.5° C. Infrared analysis, nuclear magnetic resonance analysis and the following analytical data revealed that 2-methyl-2-(p-nitrophenyl)-6-nitro-indanone-1 had been obtained.

Analysis.—Calc'd for $C_{16}H_{12}N_2O_5$: C, 61.51; H, 3.87; N, 8.97. Found: C, 61.63; H, 3.95; N, 9.16.

Example 2

2,3-dimethyl-2-phenylindanone-1 was prepared from 1,2-dichloro-2-methylpropane, benzene and carbon monoxide in the presence of aluminum chloride.

Following the procedure of Example 1, 11.8 g. (0.05 mole) of 2,3-dimethyl-2-phenylindanone-1 was added to a mixture of 10 g. (0.11 mole) 69.5 percent nitric acid and 15 g. 96–98 percent sulfuric acid. The addition was completed in 30 minutes, and the reaction mixture was then heated at 75° C. for 30 minutes. After cooling, the reaction mixture was poured onto crushed ice and treated with ether to provide a solid precipitate, which was recrystallized from ethyl acetate to provide 7.4 g. of colorless needles, M.P. 211–213° C. Infrared analysis, nuclear magnetic resonance analysis and the following analytical data revealed that 2,3-dimethyl-2-(p-nitrophenyl)-6-nitro-indanone-1 had been obtained.

*Analysis.*—Calc'd for $C_{17}H_{14}N_2O_5$: C, 62.60; H, 4.29; N, 8.59. Found: C, 62.75; H, 4.57; N, 8.73.

What is claimed is:

1. A dinitro-2-methyl-2-phenylindanone having the formula

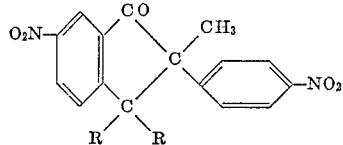

wherein each R is independently selected from the group consisting of hydrogen and alkyl having from 1 to 4 carbon atoms.

2. The compound of claim 1 having the name 2-methyl-2-(p-nitrophenyl)-6-nitro-indanone-1.

3. The compound of claim 1 having the name 2,3-dimethyl-2-(p-nitrophenyl)-6-nitro-indanone-1.

References Cited

FOREIGN PATENTS 276,165  10/1964  Netherlands.

DANIEL D. HORWITZ, *Primary Examiner.*